United States Patent
Kurtz et al.

(10) Patent No.: US 8,051,829 B2
(45) Date of Patent: Nov. 8, 2011

(54) METHOD FOR CONTROLLING LOW TEMPERATURE COMBUSTION

(75) Inventors: Eric Kurtz, Dearborn, MI (US); Michiel J. Van Nieuwstadt, Ann Arbor, MI (US); Thomas Alan Brewbaker, Plymouth, MI (US); Michael Hopka, Saint Clair Shores, MI (US); Douglas Kuhel, Wolverine Lake, MI (US); David Joseph Dronzkowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/900,959

(22) Filed: Oct. 8, 2010

(65) Prior Publication Data
US 2011/0168129 A1 Jul. 14, 2011

(51) Int. Cl.
*F02B 3/06* (2006.01)
(52) U.S. Cl. .................. 123/305; 123/457; 123/511
(58) Field of Classification Search .............. 123/299, 123/672, 457, 510, 511, 1 A, 435, 466, 300, 123/305; 701/103–105
See application file for complete search history.

(56) References Cited

U.S. PATENT DOCUMENTS

| | | | |
|---|---|---|---|
| 5,438,967 A * | 8/1995 | Ito | 123/339.12 |
| 5,740,775 A | 4/1998 | Suzuki et al. | |
| 6,742,492 B2 | 6/2004 | Kimura | |
| 6,763,799 B2 | 7/2004 | Ito et al. | |
| 6,994,077 B2 * | 2/2006 | Kobayashi et al. | 123/568.11 |
| 7,350,504 B2 * | 4/2008 | Yasunaga et al. | 123/406.47 |
| 7,500,471 B2 * | 3/2009 | Adachi et al. | 123/436 |
| 7,848,871 B2 * | 12/2010 | Onishi et al. | 701/104 |
| 2007/0235009 A1 * | 10/2007 | Nakashima et al. | 123/458 |

FOREIGN PATENT DOCUMENTS
WO 2009063298 A1 5/2009
* cited by examiner

*Primary Examiner* — Hai Huynh
(74) *Attorney, Agent, or Firm* — Julia Voutras; Alleman Hall McCoy Russell & Tuttle LLP

(57) ABSTRACT

A method for adjusting fuel injection of an engine is disclosed. In one example, fuel injection timing is adjusted to account for fuels having different cetane numbers. Operation of the engine may be improved especially during conditions where combustion phase may vary.

20 Claims, 5 Drawing Sheets

$T_0$

US 8,051,829 B2

METHOD FOR CONTROLLING LOW TEMPERATURE COMBUSTION

BACKGROUND/SUMMARY

Fuel filling stations may provide fuel that varies by cetane number. The cetane number of a fuel provides a reference to the ignition delay of the fuel. In particular, higher cetane fuels have a shorter ignition delay and lower cetane fuels have longer ignition delay. The only fuel cetane requirement in the U.S. is for cetane to be greater than 40, and testing has revealed that consumer diesel fuel cetane may vary at least from 40.3 to 56.9 from time-to-time. Although it may not be useful to determine a specific cetane number for a combusted fuel during engine operation, it has been recognized that engine emissions can vary with cetane because the variation in ignition delay can affect combustion products of a cylinder air-fuel mixture. Therefore, it may be desirable to recognize fuels that have different cetane numbers.

In International Patent Application Publication WO2009063298 the inventors describe a method for estimating the cetane number of a fuel based on estimated injection timing. The method appears to determine a fuel cetane number from injection timing at which misfiring starts to occur, the misfire is based on a variation in the increase in engine torque as the timing of the fuel injections are shifted. After the cetane number is determined, the method appears to decrease fuel injection pressure as start of injection (SOI) timing is retarded. However, the method may not be suitable for low temperature combustion where longer ignition delay may result in formation of lower amounts of combustion particulate matter and where shorter ignition delay may result in formation of increased amounts of combustion particulate matter.

The inventors herein have recognized the above-mentioned disadvantages and have developed an engine operating method, comprising: combusting an air-fuel mixture in an engine where a delay from end of fuel injection to start of combustion is present; and adjusting fuel injection pressure and start of fuel injection timing in response to feedback of the air-fuel mixture combustion, the fuel injection pressure increasing as start of fuel injection timing is retarded.

By increasing fuel injection pressure and retarding start of fuel injection timing, it may be possible to provide combustion heat release during low temperature combustion for higher cetane fuel that is similar to that of a nominal cetane fuel. Further, fuel injection pressure can be reduced and start of fuel injection timing can be advanced so that combustion heat released for a lower cetane fuel is similar to that of a nominal cetane fuel. In this way, the injection timing and pressure adjustments for a fuel having a cetane number that varies from a nominal cetane number can be adjusted so that engine emissions are similar even when a different level cetane fuel is combusted.

The present description may provide several advantages. For example, the approach may reduce engine emissions when fuels with varying cetane numbers are combusted in an engine. Further, the approach may be included as part of a system to control torque from combustion feedback. Further still, the approach may improve vehicle drivability during some conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
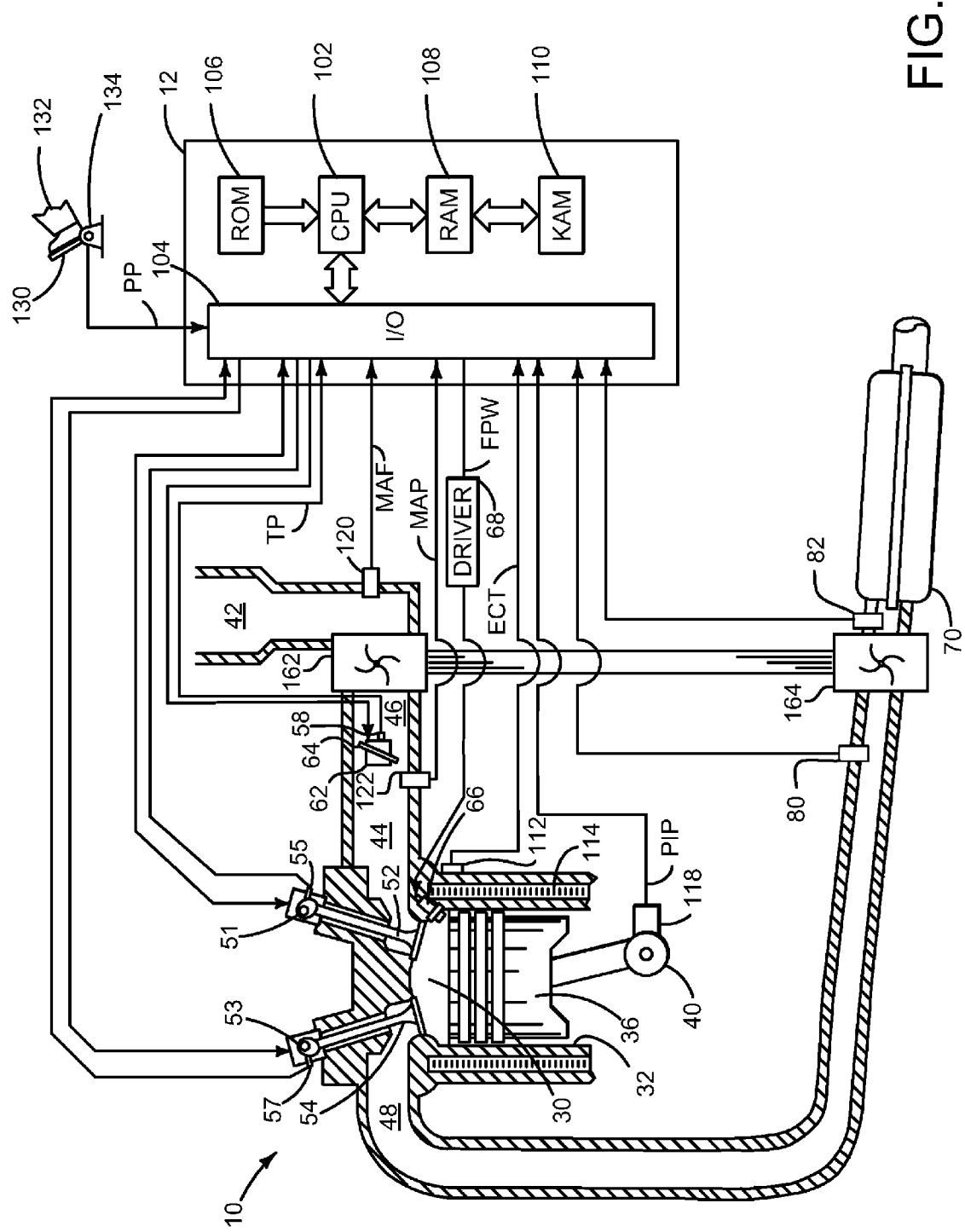
FIG. 1 shows a schematic depiction of an engine.
Figure 4:
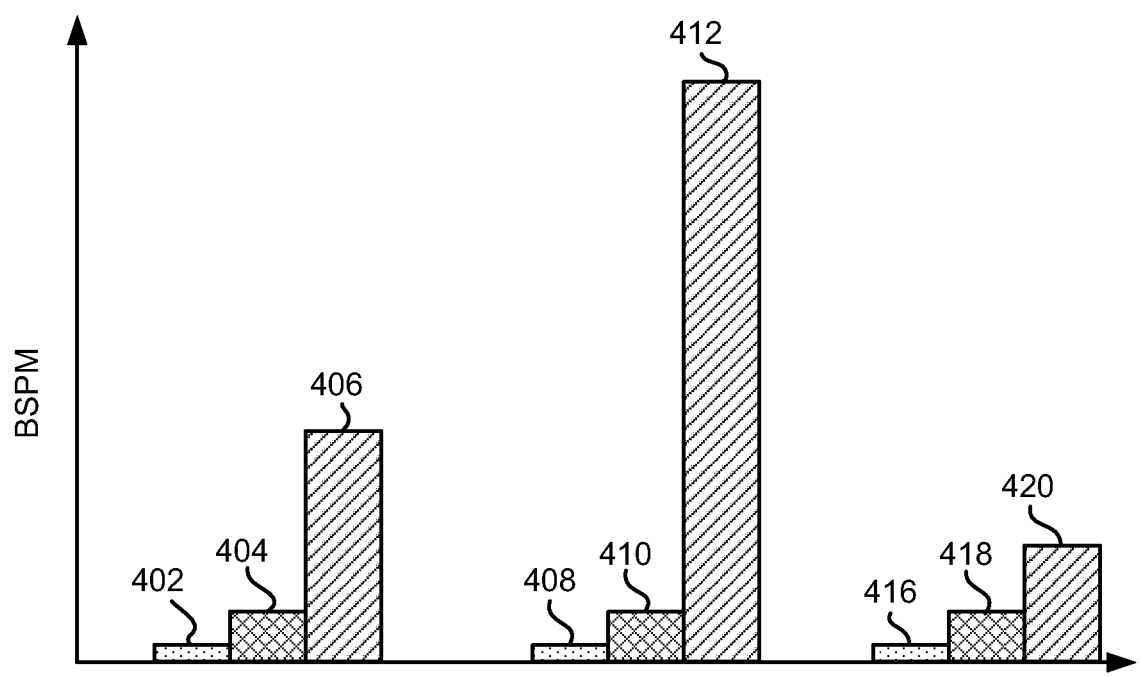
FIG. 4 shows example engine particulate emissions for no cetane fuel injection compensation, SOI compensation, and SOI and fuel pressure compensation.

The present description is related to controlling fuel injection of an engine. FIG. 1 shows one example of a boosted direct injection engine where the method of FIG. 5 may adjust fuel injection to compensate for fuel cetane. FIG. 4 shows an example of engine emission benefits that may be provided by the method of FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. Fuel injector 66 is supplied operating current from driver 68 which responds to controller 12.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162.

Combustion is initiated in combustion chamber 30 when fuel automatically ignites as piston approaches top-dead-center compression stroke. In some examples, a universal Exhaust Gas Oxygen (UEGO) sensor (not shown) may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a SCR.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a pressure sensor 80 for sensing exhaust pressure upstream of turbine 164; a pressure sensor 82 for sensing exhaust pressure downstream of turbine 164; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition or by known ignition means such as spark plug (not shown), resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC.

Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: an engine; a direct fuel injector coupled a cylinder of the engine; a fuel pump supplying fuel pressure to the direct fuel injector; and a controller, the controller including instructions for adjusting a pressure supplied by the fuel pump to the direct fuel injector and start of fuel injection timing in response to feedback to combustion of an air-fuel mixture, the fuel injection pressure increasing as start of fuel injection timing is retarded, the pressure supplied by the fuel pump adjusted in response to a difference between a base start of fuel injection timing and a commanded fuel injection timing. The engine system includes where the controller includes further instructions for adjusting the pressure supplied by the fuel pump in response to an amount of hydrocarbons in exhaust of the engine. The engine system includes where the controller includes further instructions for adjusting the pressure supplied by the fuel pump in response to an amount of particulate matter in exhaust of the engine. The engine system includes where the controller includes further instructions for adjusting an amount of EGR supplied to the engine to adjust combustion phasing in response to the air-fuel mixture combustion. The engine system includes where the controller includes further instructions for adjusting the pressure supplied by the fuel pump in response to a temperature of the engine. The engine system includes where the air-fuel mixture combustion feedback is provided by a knock sensor.

Figure 2A:
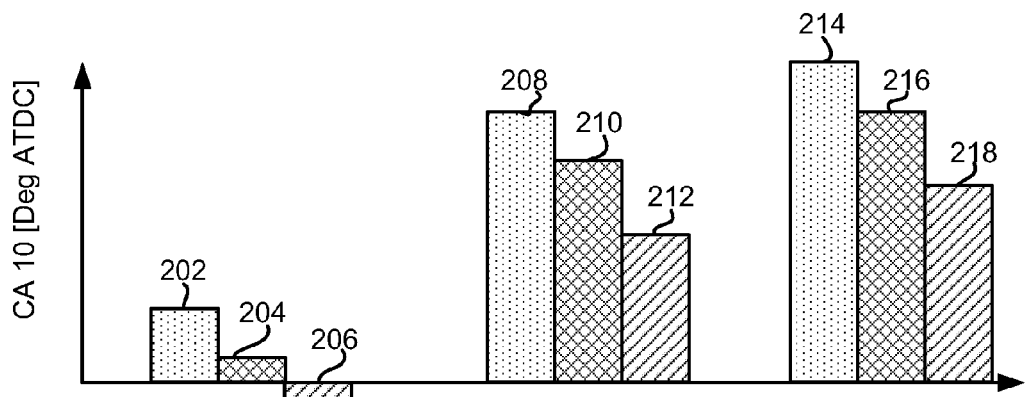
FIGS. 2A-2D show example CA-10, engine particulate emissions, NOx related to fuel cetane, and HC related to fuel cetane.
Figure 2B:
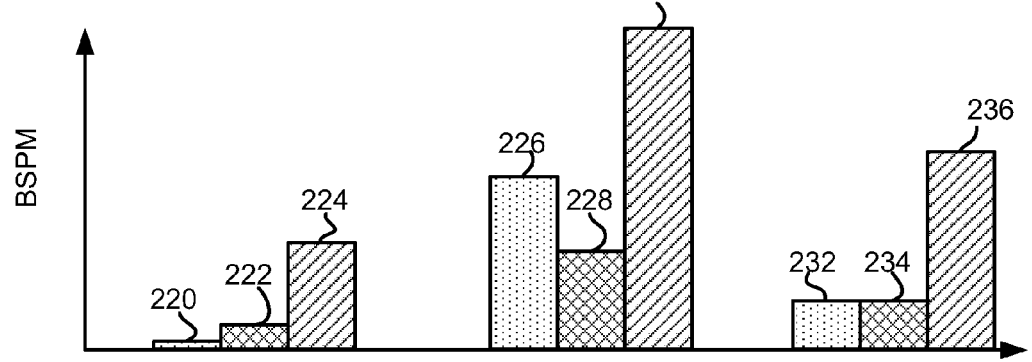
Figure 2C:
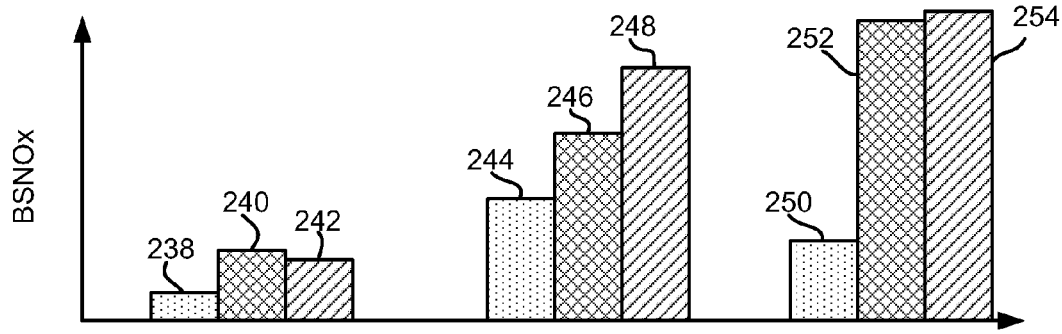

FIGS. 2A-2C show the effect fuel cetane can have on engine operation and emissions. In particular, bar graphs showing representative prophetic CA 10, particulate matter production, and NOx are shown for an engine operating at different engine speeds and loads where three fuels having different cetane numbers are combusted at substantially similar combustion conditions. It should be mentioned that the fuels having the specific cetane numbers illustrated are not intended to limit the scope or breadth of the disclosure but are included as examples to show how fuels having different cetane numbers can alter engine operation.

Referring now to FIG. 2A, a bar chart of CA 10 for fuels having different cetane is shown. CA 10 refers to an engine crankshaft angle after top-dead-center compression stroke where 10% of heat from a combusted air-fuel mixture is released. Likewise, CA 50 refers to an engine crankshaft angle after top-dead-center compression stroke where 50% of heat from a combusted air-fuel mixture is released. The engine crankshaft angle at which heat from the air-fuel mixture is combusted can influence the amount of torque produced by the cylinder as well as the emissions of the cylinder. FIG. 2A shows how relative magnitude of CA 10 timing varies for different engine speeds, engine loads, and fuel cetane numbers.

The Y-axis represents crankshaft angle for CA 10. The X axis and Y axis intercept represents top-dead-center compression stroke. The crankshaft angle after top-dead-center compression stroke is positive and increases in the direction of the Y axis arrow. The crankshaft angle before top-dead-center compression stroke is negative and decreases in a direction away from the X axis.

Bars 202, 204, and 206 represent CA 10 for fuel cetane of 40.3 (bar 202), fuel cetane of 44 (bar 204), and fuel cetane of 56.9 (bar 206) at an engine speed of 1500 RPM and a load of 3 bar brake mean effective pressure (BMEP). Bars 208, 210, and 212 represent CA 10 for fuel cetane of 40.3 (bar 208), fuel cetane of 44 (bar 210), and fuel cetane of 56.9 (bar 212) at an engine speed of 1500 RPM and a load of 6 bar BMEP. Bars 214, 216, and 218 represent CA 10 for fuel cetane of 40.3 (bar 214), fuel cetane of 44 (bar 216), and fuel cetane of 56.9 (bar 218) at an engine speed of 2500 RPM and a load of 4 bar BMEP. Thus, it can be seen from FIG. 2A that CA 10 varies from engine operating point to engine operating point and between fuels having different cetane numbers. Consequently, it may be desirable to reduce the variation fuel cetane has on CA 10 timing.

Referring now to FIG. 2B, a bar chart of engine exhaust particulate matter for fuels having different cetane is shown. FIG. 2B shows how relative magnitude of brake specific particulate matter (BSPM in units of g/KWh for example) varies for different engine speeds, engine loads, and fuel cetane numbers. In some examples, engine particulate matter is trapped in a particulate filter located in the exhaust stream. If an engine produces higher levels of particulate matter, the particulate filter will have to be regenerated more often to maintain exhaust pressure at a desired level. Therefore, it is desirable to reduce engine particulate matter to reduce particulate filter regeneration.

Bars 220, 222, and 224 represent BSPM for fuel cetane of 40.3 (bar 220), fuel cetane of 44 (bar 222), and fuel cetane of 56.9 (bar 224) at an engine speed of 1500 RPM and a load of 3 bar BMEP. Bars 226, 228, and 230 represent BSPM for fuel cetane of 40.3 (bar 226), fuel cetane of 44 (bar 228), and fuel cetane of 56.9 (bar 230) at an engine speed of 1500 RPM and a load of 6 bar BMEP. Bars 232, 234, and 236 represent BSPM for fuel cetane of 40.3 (bar 232), fuel cetane of 44 (bar 234), and fuel cetane of 56.9 (bar 236) at an engine speed of 2500 RPM and a load of 4 bar BMEP. Thus, it can be seen from FIG. 2A that BSPM varies from engine operating point to engine operating point and between fuels having different cetane numbers. Further, it can be seen that particulate matter increases with higher cetane fuels.

Referring now to FIG. 2C, a bar chart of engine NOx for fuels having different cetane is shown. FIG. 2C shows how relative magnitude of brake specific NOx (BSNOx in g/KWh for example) varies for different engine speeds, engine loads, and fuel cetane numbers. NOx may be formed in a cylinder when cylinder temperature increases in the presence of excess oxygen.

Bars 238, 240, and 242 represent BSNOx for fuel cetane of 40.3 (bar 238), fuel cetane of 44 (bar 240), and fuel cetane of 56.9 (bar 242) at an engine speed of 1500 RPM and a load of 3 bar BMEP. Bars 244, 246, and 248 represent BSNOx for fuel cetane of 40.3 (bar 244), fuel cetane of 44 (bar 246), and fuel cetane of 56.9 (bar 248) at an engine speed of 1500 RPM and a load of 6 bar BMEP. Bars 250, 252, and 254 represent BSNOx for fuel cetane of 40.3 (bar 250), fuel cetane of 44 (bar 252), and fuel cetane of 56.9 (bar 254) at an engine speed of 2500 RPM and a load of 4 bar BMEP. Thus, NOx can vary for fuels with different cetane numbers; however, NOx during low temperature combustion is at low levels and therefore does not require additional fuel delivery compensation.

Figure 2D:
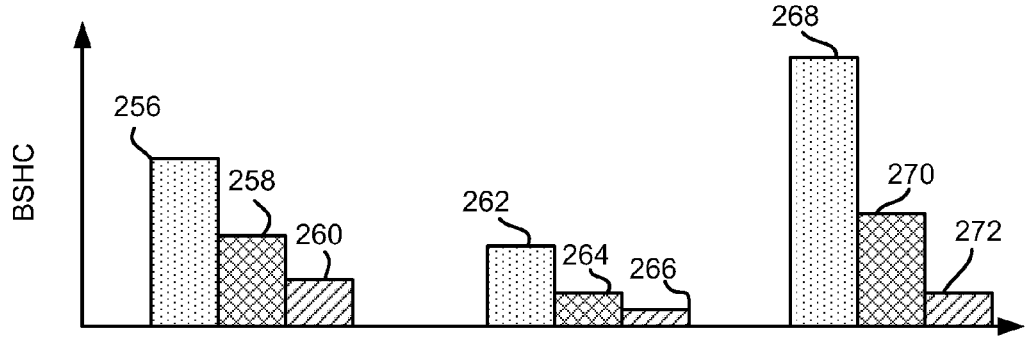

Referring now to FIG. 2D, a bar chart of engine hydrocarbons (HC) for fuels having different cetane is shown. FIG. 2D shows how relative magnitude of brake specific HC (BSHC in g/KWh for example) varies for different engine speeds, engine loads, and fuel cetane numbers. HC may result from fuel that is not completely combusted during a cylinder cycle.

Bars 256, 258, and 260 represent BSHC for fuel cetane of 40.3 (bar 238), fuel cetane of 44 (bar 240), and fuel cetane of 56.9 (bar 242) at an engine speed of 1500 RPM and a load of 3 bar BMEP. Bars 262, 264, and 268 represent BSHC for fuel cetane of 40.3 (bar 244), fuel cetane of 44 (bar 246), and fuel cetane of 56.9 (bar 248) at an engine speed of 1500 RPM and a load of 6 bar BMEP. Bars 268, 270, and 272 represent BSHC for fuel cetane of 40.3 (bar 250), fuel cetane of 44 (bar 252), and fuel cetane of 56.9 (bar 254) at an engine speed of 2500 RPM and a load of 4 bar BMEP. Thus, HC can vary for fuels with different cetane numbers. Further, it can be seen that HC increases with lower cetane fuels.

It can be seen from FIGS. 2A-2D that it is beneficial for an engine to operate at or near conditions where nominal cetane fuels are combusted. Further, it can be deduced that engine operation may be improved if fuels having cetane numbers that are higher than nominal cetane numbers are combusted under conditions where the combustion is similar to that of nominal cetane fuels.

FIGS. 3A-3D show prophetic injection timing and heat release during low temperature combustion of an air-fuel mixture. In particular, heat release produced during combustion of fuel having a nominal cetane number is contrast with heat release of combustion of a higher cetane fuel. The Y axis of each graph represents magnitude of fuel pressure and heat release. Fuel pressure and heat release increase in the direction of the Y axis arrow. The X axis represents time and time increases from the left to right side of the figure in the direction of the X axis arrow.

Figure 3A:
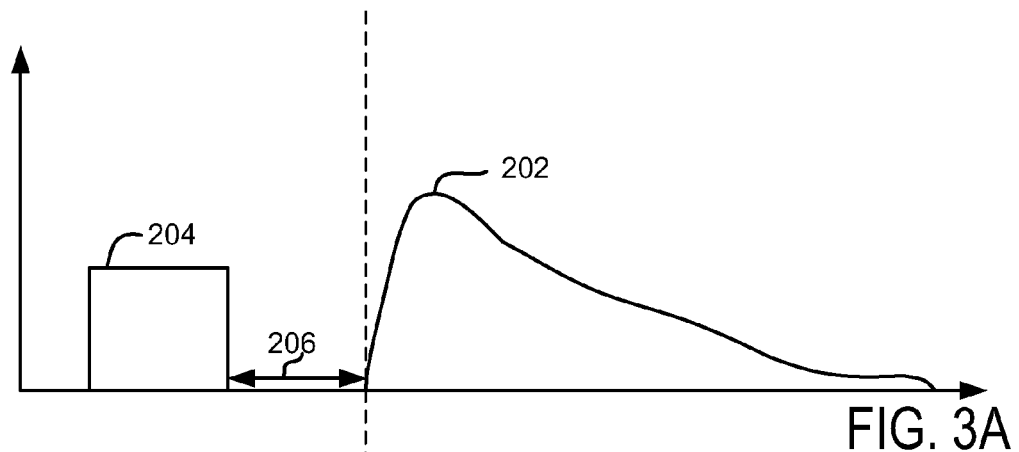
FIGS. 3A-3D show simulated injection timing and combustion heat release for fuels with different cetane.

Referring now to FIG. 3A, a plot of a fuel injection and cylinder heat release for a combustion of a fuel having a nominal cetane number is shown. Fuel injection timing is indicated by the width of fuel pulse 204 while fuel injection pressure is represented by the height of fuel pulse 204. As fuel pressure increases, additional fuel is injected per unit time. Thus, if injection timing is reduced, fuel pressure has to be increased to provide a same amount of fuel as when fuel is injected in a shorter injection time period. Heat release during combustion of fuel pulse 204 is shown by trace 202. The amount of time 206 between the end of injection of fuel pulse 204 and the beginning of heat release at trace 202 at time $T_0$ is positive ignition dwell or dwell time. As can be seen from trace 202, heat is quickly released at a higher rate and then decays as time increases. Positive ignition dwells are desirable because particulate matter during low temperature combustion may be reduced.

Figure 3B:
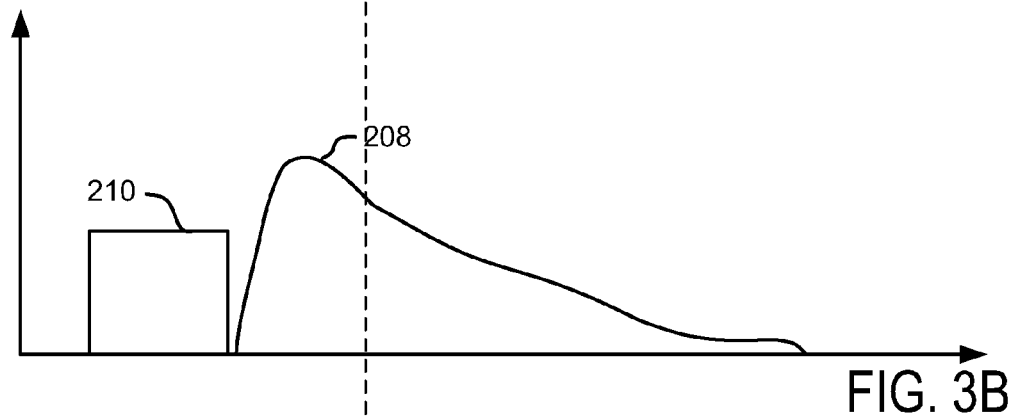

Referring now to FIG. 3B, a plot of a fuel injection and cylinder heat release of a fuel having a higher cetane number is shown. Similar to FIG. 3A, fuel injection timing is indicated by the width of fuel pulse 210 while fuel injection pressure is represented by the height of fuel pulse 210. Heat release during combustion of fuel pulse 210 is shown by trace 208. Notice that the timing of fuel injection and the fuel injection pressure is equivalent between plot 3A and 3B. However, heat release trace 208 occurs at a time advanced of time $T_0$ where heat release of a fuel having a nominal cetane begins. Consequently, the production of engine torque and emissions can change as fuels having higher cetane numbers as compared to nominal cetane fuels are combusted at fuel injection timing that are similar.

Figure 3C:
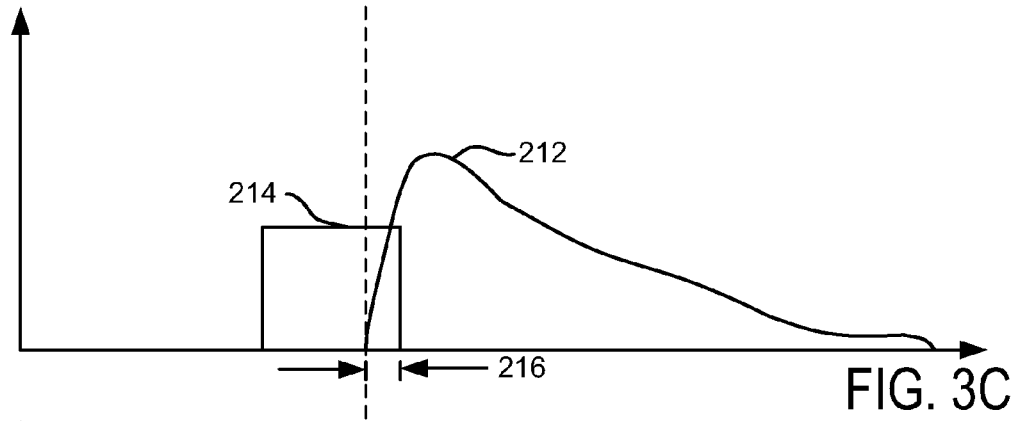

Referring now to FIG. 3C, a plot of a fuel injection of a high cetane fuel with adjusted fuel injection timing and cylinder heat release is shown. Fuel injection timing is indicated by the width of fuel pulse 214 while fuel injection pressure is represented by the height of fuel pulse 214. Heat release during combustion of fuel pulse 214 is shown by trace 212. Notice that the timing of fuel injection is retarded from the fuel injection timing of FIGS. 3A and 3B. However, the fuel injection pressure is equivalent with that of plots 3A and 3B. Retarding fuel injection timing shifts heat release trace 212 from the heat release timing of trace 208 back to the heat release timing of trace 202, namely timing at time $T_0$. As a result, the production of engine torque is coincident with that of FIG. 3A. Notice that the end of fuel injection timing is delayed from the start of heat release at $T_0$. Negative overlap period 216 is formed by injection timing ending after start of heat release. Formation of particulate matter can increase when negative overlap occurs between injection timing and start of heat release occurs. Therefore, it is desirable to reduce the amount of negative overlap.

Figure 3D:
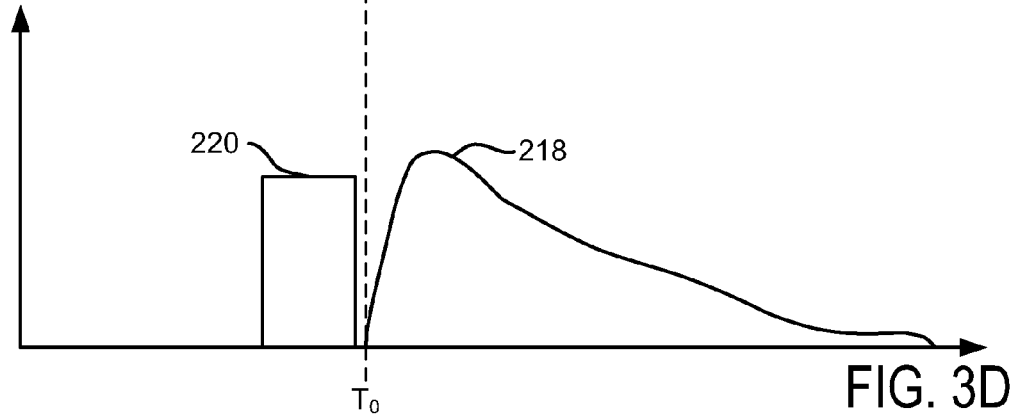

Referring now to FIG. 3D, a plot of a fuel injection of a high cetane fuel with adjusted fuel injection timing and increased fuel pressure is shown. FIG. 3D also includes heat release trace 218 indicating when fuel pulse 220 is combusted. Similar to FIGS. 3A-3C, fuel injection timing is indicated by the width of fuel pulse 220 while fuel injection pressure is represented by the height of fuel pulse 220. By increasing the fuel injection pressure of fuel pulse 220, an equivalent amount of fuel is injected to the engine in less time as compared to the fuel injection durations shown in FIGS. 3A-3C. Notice now that fuel pulse 220 ends before time $T_0$. Heat is released by the cylinder air-fuel mixture at time $T_0$ as combustion is initiated, and the end of fuel injection pulse 220 is advanced of heat release. Thus, by retarding start of fuel injection timing and increasing fuel pressure, heat can be released from a fuel having a higher cetane number after end of fuel injection so that engine torque and particulate matter produced by combusting the higher cetane fuel is similar to that of a nominal cetane fuel during similar engine operating conditions.

Referring now to FIG. 4, a bar graph showing plot of BSPM and fuel injection method is shown. The amount of fuel injected and engine operating conditions are similar for the three groups of bar graphs. The amount of particulate matter produced during air-fuel mixture combustion increases in the direction of the Y axis arrow.

The first group of bars comprising bars 402, 404, and 406 represent BSPM for fuel cetane of 40.3 (bar 402), fuel cetane of 44 (bar 404), and fuel cetane of 56.9 (bar 406) at an engine speed of 1500 RPM and a load of 3 bar BMEP. The fuel injection for bars 402-406 is not compensated to account for the different fuel cetane numbers and fuel injection pressure is 914 bar. The second group of bars comprising bars, 408, 410 and 412 represent BSPM for fuel cetane of 40.3 (bar 408), fuel cetane of 44 (bar 410), and fuel cetane of 56.9 (bar 412) at an engine speed of 1500 RPM and a load of 3 bar BMEP. The fuel injection pressure for the second group of bars is 914 bar. The fuel injection for bars 408-412 compensates for the cetane number of injected fuel by adjusting the start of fuel injection timing. In particular, the SOI timing is retarded for fuel having a higher cetane number. The third group of bars comprising bars 416, 418, and 420 represent BSPM for fuel cetane of 40.3 (bar 416), fuel cetane of 44 (bar 418), and fuel cetane of 56.9 (bar 420) at an engine speed of 1500 RPM and a load of 3 bar BMEP. The fuel injection pressure for bar 416 is 750 bar while the fuel injection pressure for bar 420 is 1250 bar. Thus, from FIG. 4 it can be seen that particulate matter produced when higher cetane fuels are combusted can be reduced when start of fuel injection is retarded and fuel injection pressure is increased. Further, engine efficiency can be increased when lower cetane fuels are combusted by advancing start of fuel injection and lowering fuel injection pressure.

Figure 5:
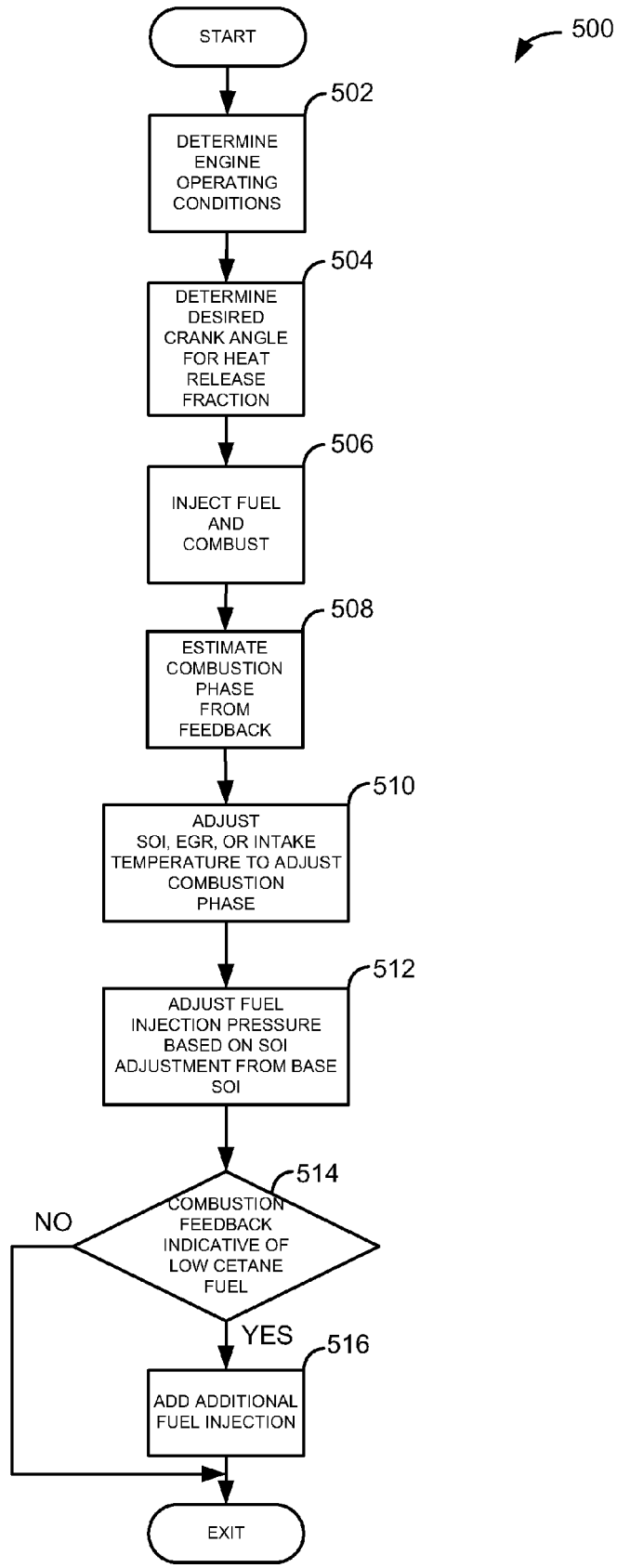
FIG. 5 shows a flowchart of an example method for compensating for fuels of varying cetane.

Referring now to FIG. 5, a flowchart of an example method for compensating for fuels having different cetane numbers is shown. The method of FIG. 5 is executable via instructions of a controller such as is shown in FIG. 1. Further, low temperature combustion can be characterized as combusting an air-fuel mixture in an engine where a delay from end of fuel injection to start of combustion is present. Method 500 may be particularly useful during low temperature combustion.

At 502, method 500 determines engine operating conditions. Engine operating conditions may include but are not limited to fuel injection pressure, engine speed, engine load, an engine temperature, engine knock, engine vibration, and engine cylinder pressures. Method 500 proceeds to 504 after engine operating conditions are determined.

At 504, method 500 determines a desired crankshaft angle for a selected heat release fraction. In one example, a CA 10 timing is determined in response to engine speed and engine load. For example, at an engine speed of 1500 RPM and 3 bar BMEP, a CA 10 timing of 3 crankshaft degrees after top-dead-center of compression stroke of a cylinder may be selected as the desired CA 10 timing. In another example, a CA 50 timing is determined in response to engine speed and engine load. In particular, a CA 50 timing is determined for engine speed of 2000 RPM and 6 bar BMEP. Thus, method 500 can select different mixture heat release fractions and different crankshaft angles where the heat release fraction is released from a combusted air-fuel mixture. Method 500 proceeds to 506 after the desired crankshaft angle for a heat release fraction is determined.

At 506, method 500 injects fuel at a SOI timing and pressure that is empirically determined to provide a heat release fraction at the crankshaft angle determined at 504. In one example, method 500 begins by injecting fuel at timing and pressure that is based on a nominal cetane number. If it is determined that the heat release fraction is not at the crankshaft angle determined at 504, method 500 can adjust the injection timing and pressure at 510 and 512. Once the fuel adjustment is added to the base injection timing and pressure, fuel is injected and combusted in a cylinder of the engine. Method 500 proceeds from 506 to 508.

At 508, method 500 estimates combustion phase from feedback. Method 500 may determine combustion phase by judging a crankshaft angle difference between a desired heat release and an actual heat release. For example, if a desired CA 10 crankshaft angle is 5 degrees after top-dead-center compression stroke and the actual CA 10 crankshaft angle is 8 degrees after top-dead-center compression stroke, a combustion phase of 3 crankshaft degrees from desired is determined.

Combustion phase may be determined via cylinder pressure sensors or engine accelerometers (e.g., knock sensors). In one example, peak cylinder pressure is feedback to the engine controller to control SOI. In some examples, the amount of heat release that is most observable is selected as a basis for adjusting fuel injection in response to a fuel cetane number. For example, if CA 50 is more easily determined than CA 10, fuel injection timing adjustments in response fuel cetane may be based on CA 50 crankshaft angle timing.

In some examples, ignition dwell may also be determined at 508. In one example, ignition dwell is determined based on end of fuel injection of a first main fuel pulse and start of heat release. The dwell time may be determined from the end of a fuel injection pulse to start of heat release as determined from a cylinder pressure sensors or a knock sensor. Method 500 may determine both positive and negative ignition dwell.

In still other examples, an amount of particulate matter formed during combustion of an air-fuel mixture may be determined in lieu of combustion phasing. For example, an amount of particulate matter exhausted from a cylinder at an engine operating condition may be determined instead of combustion phasing. The amount of particulate matter may be determined via a particulate matter sensor. If the amount of particulate matter increases from an amount of particulate matter produced during substantially similar engine operating conditions, it may be judged that a higher cetane fuel is presently being combusted because combustion of higher cetane fuels may result in negative ignition dwell.

In still another example, exhaust gas hydrocarbons exhausted after combustion of an air-fuel mixture may be determined in lieu of combustion phasing. For example, an amount of hydrocarbons may be determined via a hydrocarbon sensor. If the amount of hydrocarbons increases from an amount of hydrocarbons produced during substantially similar, it may be judged that a lower cetane fuel is presently being combusted because combustion of lower cetane fuels may result in longer positive ignition dwell.

In still other examples, fuel quality may be feed back to an engine controller and SOI and rail pressure may be adjusted in response to fuel quality rather than heat release. For example, if a fuel quality sensor indicates higher cetane than nominal, SOI timing is retarded and fuel injection pressure is increased. Method 500 proceeds to 510 after combustion phase is determined.

At 510, method 500 adjusts SOI, EGR, or intake gas temperature to adjust combustion phase. In some examples, SOI and EGR may be simultaneously adjusted. In other examples, SOI, EGR, and intake gas temperature may be adjusted to adjust combustion phase. In one example, SOI is retarded from an empirically determined timing in response to a CA 10 timing that advances under substantially similar engine operating conditions, but where the cetane number of the presently injected fuel is higher than that of the nominal cetane fuel. In another example, SOI is advanced from base SOI timing in response to a CA 10 timing that is retarded under substantially similar engine operating conditions, but where the cetane number of the presently injected fuel is lower than that of the nominal cetane fuel. In another example, a first parameter selected from a group of SOI, EGR, and intake gas temperature are adjusted for higher cetane fuels. While when lower cetane fuel is combusted a different second parameter (e.g., different from the first parameter) is selected from the group of SOI, EGR, and intake gas temperature.

The amount (e.g., crankshaft angle in degrees) of SOI advance or retard may be based on or in response to an amount of particulate matter formation, HCs, or determined amount of a combustion phase. In one example, the SOI timing adjustment is retrieved from a table of empirically determined values. The table is indexed by the amount of combustion phase at the present engine operating conditions. Method 500 proceeds to 512 after the SOI adjustment is determined. EGR amount can be decreased or intake temperature can be increased for lower cetane fuels. EGR amount can be increased and intake temperature can be decreased for higher cetane fuels.

At 512, method 500 adjusts fuel injection pressure. In one example, the fuel injection pressure is adjusted in response to a difference between a base SOI timing and an adjusted SOI timing according to the following equation:

$$\Delta P\_inj = f(SOI\_base - SOI\_act)$$

Where $\Delta P\_inj$ is the change in fuel injection pressure in response to combustion phase of a fuel that has a cetane number that varies from a nominal cetane fuel, SOI_base is a base start of injection timing that is in crankshaft degrees, and SOI_act is an actual start of injection timing. Thus, in one example, the change in fuel injection pressure is a function of base SOI timing and actual SOI timing. So, for a change in SOI timing from base timing, a fuel injection pressure can be increased or decreased based in empirically determined values that make up the function describing the fuel injection pressure adjustment. And, since SOI timing can be adjusted based on an amount of detected hydrocarbons or particulate matter, injection pressure can be adjusted in response to an amount of detected hydrocarbons or particulate matter. Further, in some examples, the change in fuel pressure and injection timing can be further adjusted in response to an engine temperature. For example, if it is determined that a higher cetane fuel is presently being combusted, SOI can be retarded while fuel injection pressure is increase. And, the fuel injection pressure may be decreased when engine temperature is less than nominal warm engine operating temperature. Method 500 proceeds to 514 after fuel pressure is adjusted in response to a change in SOI from base SOI timing.

In an alternative example, fuel injection pressure may be adjusted in response to ignition delay or ignition dwell. For example, if ignition delay is reduced, fuel injection pressure can be increased in response decreased ignition delay.

At 514, method 500 judges whether or not combustion feedback is indicative of a low cetane fuel. In one example, method 500 judges a low cetane fuel is being combusted when an injection dwell time increases beyond a base ignition dwell time. If method 500 judges a low cetane fuel is being combusted, method 500 proceeds to 516. Otherwise, method 500 proceeds to exit.

At 516, method 500 may add an additional fuel injection pulse. In one example, an additional fuel injection pulse is scheduled when ignition dwell exceeds a predetermined number of crankshaft degrees. If an additional fuel injection pulse is added, the timing of the fuel injection pulse may be related to the difference between base SOI timing and adjusting SOI timing. For example, if SOI timing is advanced by more than 5 crankshaft angle degrees, it may be judged to add a second fuel injection pulse 10 crankshaft degrees after the end of injection of the first fuel pulse. In one example, a table or function of empirically determined fuel pulses may be interrogated for timing of a second fuel pulse based on the difference between base SOI timing and actual SOI timing.

In other examples, a base calibration may include multiple injections during a single cylinder cycle for a nominal cetane fuel. When lower cetane fuel is combusted, another fuel pulse may be added during a cylinder combustion cycle, and the base injections are advanced within the cylinder cycle. When higher cetane fuel is combusted, one or more injections may be eliminated during a cylinder cycle because of the time it takes to get all injections in before the start of combustion. Thus, a number of fuel injections may increase or decrease in response to ignition delay (the time that is needed to get all the injections done for LTC). Further, in some examples, the timing of a last or final fuel injection during a cylinder cycle may be maintained while the timing of prior injections during the same cylinder cycle are adjusted. Method 500 proceeds to exit after timing of a fuel is determined.

It should be noted that while the method of FIG. 5 is suitable for adjusting for changes in timing and rate of combustion heat release related to fuel cetane, the method of FIG. 5 is also suitable for adjusting for changes in timing and rate of combustion heat release related to variation in compression ratio from cylinder to cylinder, EGR maldistribution, start of fuel injection timing errors, intake air temperature difference from nominal, variation in engine temperature from nominal engine temperature, and intake oxygen variation. Thus, fuel injection pressure and start of injection timing can be adjusted for virtually any combustion parameter that affects timing and rate of combustion heat release.

Thus, the method of FIG. 5 provides for an engine operating method, comprising: combusting an air-fuel mixture in a cylinder where a delay from end of fuel injection to start of combustion is present; and adjusting fuel injection pressure and start of fuel injection timing in response to feedback of the air-fuel mixture combustion, the fuel injection pressure increasing as start of fuel injection timing is retarded. The engine operating method further comprises providing a plurality of fuel injections to the cylinder during a cylinder cycle, substantially maintaining a timing of a final injection of the plurality of fuel injections, and adjusting timing of at least one fuel injection of a remainder of the plurality of fuel injections in response to a change in combustion heat release. The engine operating method includes where the fuel injection pressure is increased and the start of fuel injection is retarded in response to an increasing amount of particulate matter in exhaust of the engine. The engine operating method includes where the fuel injection pressure is decreased and the start of fuel injection is advanced in response to an increasing hydrocarbon amount in exhaust of the engine. The engine operating method includes where the feedback is provided by pressure transducers. The engine operating further comprises adjusting combustion phasing to a desired combustion phasing by adjusting fuel injection pressure and start of fuel injection timing. The engine operating method further comprises adjusting EGR or intake air temperature to adjust combustion phasing to the desired combustion phasing.

The method of FIG. 5 also provides an engine operating method, comprising: combusting an air-fuel mixture; and adjusting fuel injection pressure and start of fuel injection timing of a first fuel injection during a cylinder cycle in response to feedback of the air-fuel mixture combustion, the fuel injection pressure adjusted in response to a difference between a base start of fuel injection timing and a commanded fuel injection timing. The engine operating method includes where the start of fuel injection timing is advanced for as fuels with decreasing cetane numbers are combusted, and where the start of fuel injection timing is retarded as fuel with increasing cetane numbers are combusted. The engine operating method includes where the fuel injection pressure is increased as start of fuel injection is retarded, and where the fuel injection pressure is decreased as start of fuel injection is advanced. The engine operating method includes where the feedback is provided by a knock sensor. The engine operating method further comprises adjusting at least a start of fuel injection of a second fuel injection during the cylinder cycle in response to the adjusting of the start of fuel injection timing of a first fuel injection. The engine operating method further comprises adjusting an end of injection of the second fuel injection in response to the adjusting of the start of fuel injection timing of the first fuel injection.

As will be appreciated by one of ordinary skill in the art, the method described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine operating method, comprising:
combusting an air-fuel mixture in a cylinder via compression ignition where a delay from end of fuel injection to start of combustion related to a fuel cetane number is present; and
adjusting fuel injection pressure and start of fuel injection timing in response to feedback from combusting the air-fuel mixture, the fuel injection pressure increasing as start of fuel injection timing is retarded.

2. The engine operating method of claim 1, further comprising providing a plurality of fuel injections to the cylinder during a cylinder cycle, substantially maintaining a timing of a final injection of the plurality of fuel injections, and adjusting timing of at least one fuel injection of a remainder of the plurality of fuel injections in response to a change in combustion heat release.

3. The engine operating method of claim 1, where the fuel injection pressure is increased and the start of fuel injection timing is retarded in response to an increasing amount of particulate matter in exhaust of the cylinder.

4. The engine operating method of claim 1, where the fuel injection pressure is decreased and the start of fuel injection timing is advanced in response to an increasing hydrocarbon amount in exhaust of the cylinder.

5. The engine operating method of claim 1, where the feedback is provided by pressure transducers.

6. The engine operating method of claim 1, further comprising adjusting combustion phasing to a desired combustion phasing by adjusting fuel injection pressure and start of fuel injection timing.

7. The engine operating method of claim 6, further comprising adjusting EGR or intake air temperature to adjust combustion phasing to the desired combustion phasing.

8. An engine operating method, comprising:
combusting an air-fuel mixture via compression ignition; and
adjusting fuel injection pressure and start of fuel injection timing of a first fuel injection during a cylinder cycle in response to feedback related to a fuel cetane number from combusting the air-fuel mixture, the fuel injection pressure adjusted in response to a difference between a base start of fuel injection timing and a commanded fuel injection timing.

9. The engine operating method of claim 8, where the start of fuel injection timing is advanced when fuels with decreasing cetane numbers are combusted, and where the start of fuel injection timing is retarded as fuel with increasing cetane numbers are combusted.

10. The engine operating method of claim 9, where the fuel injection pressure is increased as start of fuel injection is retarded, and where the fuel injection pressure is decreased as start of fuel injection is advanced.

11. The engine operating method of claim 8, where the feedback is provided by a knock sensor.

12. The engine operating method of claim 8, further comprising adjusting at least a start of fuel injection of a second fuel injection during the cylinder cycle in response to the adjusting of the start of fuel injection timing of the first fuel injection.

13. The engine operating method of claim 12, further comprising adjusting an end of injection of the second fuel injection in response to the adjusting of the start of fuel injection timing of the first fuel injection.

14. An engine system, comprising:
a compression ignition engine;
a direct fuel injector coupled a cylinder of the engine;
a fuel pump supplying fuel pressure to the direct fuel injector; and
a controller, the controller including instructions for adjusting a pressure supplied by the fuel pump to the direct fuel injector and start of fuel injection timing in response to feedback of combustion of an air-fuel mixture, the pressure supplied by the fuel pump to the direct fuel injector increasing as start of fuel injection timing is retarded, the pressure supplied by the fuel pump to the direct fuel injector adjusted in response to a difference between a base start of fuel injection timing and a commanded fuel injection timing.

15. The engine system of claim 14, where the controller includes further instructions for adjusting the pressure supplied by the fuel pump to the direct fuel injector in response to an amount of hydrocarbons in exhaust of the engine.

16. The engine system of claim 14, where the controller includes further instructions for adjusting the pressure supplied by the fuel pump to the direct fuel injector in response to an amount of particulate matter in exhaust of the engine.

17. The engine system of claim 14, where the controller includes further instructions for adjusting an amount of EGR supplied to the engine to adjust combustion phasing in response to the combustion of the air-fuel mixture.

18. The engine system of claim 17, where the controller includes further instructions for adjusting the pressure supplied by the fuel pump to the direct fuel injector in response to a temperature of the engine.

19. The engine system of claim 14, where the feedback of combustion of the air-fuel mixture is provided by a knock sensor.

20. The engine system of claim 14, where the feedback of combustion of the air-fuel mixture is provided by a pressure transducer.

* * * * *